(12) United States Patent
Labbé et al.

(10) Patent No.: US 6,401,390 B1
(45) Date of Patent: *Jun. 11, 2002

(54) MULTILAYER BIODEGRADABLE MULCH AND METHODS FOR PREPARING AND USING THE SAME

(75) Inventors: Michel Labbé, Victoriaville; Marc Dubuc, Drummondville, both of (CA)

(73) Assignee: Cascades Multi-Pro Inc., Drummondville (CA)

( * ) Notice: Subject to any disclaimer, the term of this patent is extended or adjusted under 35 U.S.C. 154(b) by 8 days.

This patent is subject to a terminal disclaimer.

(21) Appl. No.: 09/633,102

(22) Filed: Aug. 4, 2000

Related U.S. Application Data

(63) Continuation-in-part of application No. 09/017,497, filed on Feb. 2, 1998.

(51) Int. Cl.⁷ .................................................. A01G 7/00
(52) U.S. Cl. ............................................. 49/9; 47/48.5
(58) Field of Search ...................................... 47/9, 48.5

(56) References Cited

U.S. PATENT DOCUMENTS

| | | | | |
|---|---|---|---|---|
| 3,892,552 A | * | 7/1975 | Gay, Jr. ........................ | 71/1 |
| 5,138,792 A | * | 8/1992 | Allingham ..................... | 47/9 |
| 5,163,247 A | | 11/1992 | Weber et al. .................. | 47/9 |
| 5,446,123 A | * | 8/1995 | Gruber et al. ................ | 528/354 |
| 5,458,933 A | | 10/1995 | Suskind ........................ | 428/34.2 |
| 5,798,436 A | | 8/1998 | Gruber et al. ................ | 528/354 |
| 5,852,166 A | | 12/1998 | Gruber et al. ................ | 528/354 |

FOREIGN PATENT DOCUMENTS

| | | |
|---|---|---|
| EP | 514137 | 11/1992 |
| WO | WO 9800459 | 1/1998 |
| WO | WO 9938904 | 8/1999 |

* cited by examiner

Primary Examiner—Charles T. Jordan
Assistant Examiner—Judith A. Nelson
(74) Attorney, Agent, or Firm—Pepper Hamilton LLP

(57) ABSTRACT

This invention relates to a mulch having a preprogrammed biodegradability comprising at least two different layers of biodegradable polymer coated onto a sheet of a cellulosic material, one of these layers being a layer of polylactide. The mulch is particularly useful to control weeds in agriculture, horticulture, and forestry industries. The biodegradability of the mulch can further be preprogrammed according to the type of soil, the climatological zone, and the specific applications wherefore it is intended to be used. The present invention is also directed to methods for preparing and using the multilayer coated mulch.

27 Claims, 1 Drawing Sheet

MULTILAYER BIODEGRADABLE MULCH AND METHODS FOR PREPARING AND USING THE SAME

This is a continuation-in-part application of U.S. application Ser. No. 09/017,497 filed on Feb. 2, 1998.

BACKGROUND OF THE INVENTION a) Field of the Invention

The present invention relates to a biodegradable mulch comprising at least two different layers of biodegradable polymer coated onto a sheet of a cellulosic material, wherein one of these layers is a layer of polylactide. More particularly, the present invention is directed to a mulch having a preprogrammed biodegradability and to methods for preparing and using the same.

b) Brief Description of the Prior Art

Bed type culture consists in harrowing the soil, then applying an agricultural mulch using a mechanical machine in such a way that mulch edges are dipped and recovered by the soil. Although not environmentally friendly, plastic mulches have been used for a long time for this type of culture. Cellulosic mulches have been experimented for many years but have never found technical acceptance. The main problem about cellulosic mulch is a premature biodegradation, particularly at the air-soil interface where biodegradation is particularly high. There is thus a need for a cellulosic mulch that is fully biodegradable but not too much in order to resist efficiently to biodegradation for an entire seasonal growth and, at the same time, capable of meeting the requirements of modern mechanized agricultural production.

It is well known in the art to coat a cellulosic sheet with a latex polymer or biodegradable polyesters. Such coated structures have found many applications, particularly in the packaging and disposable article industries and such coated structures are described in U.S. Pat. Nos. 5,163,247; 5,458,933; 5,798,436; 5,852,166; European patent application EP 514 137 and International patent application WO 98/00459. However, these coated structures have been conceived for the packaging industry and they cannot be used in the field. Indeed, the constituents of these coated structures or residues thereof are either not fully biodegradable, or either too stiff, too glossy or not sufficiently resistant to biodegradation to be used as an agricultural mulch. None of these structures can be preprogrammed to have a sufficiently useful life to serve as a mulch capable of lasting for an entire seasonal growth once deposited in the ground, nor can they be preprogrammed according to the type of soil, the type of climate nor the type of culture wherefore it is intended to be used.

The research group of the present inventors has recently disclosed in International patent application WO 99/38904 an agricultural mulch having most of the above-mentioned desired properties. This mulch comprises a sheet of paper coated with at least one layer of polylactide. As it is well known, polylactide (polylactic acid or PLA) is one of the rare polymers which are considered to be truly biodegradable. Its degradation cycle is based on a process of hydrolysis of the polymer chain. It is decomposed into lactose, water and carbon dioxide. PLA is also completely biocompatible. This means that neither the polymer nor its degradation products, are damaging to the health of living organisms. Unexpectedly, the present inventors have found that it is possible to improve the PLA coated mulch by applying to the sheet of paper at least one further layer of another biodegradable polymer. Surprisingly, the tearing strength and the stiffness of the resulting multilayer mulch is greatly increased without any detrimental effect to the biodegradation properties.

SUMMARY OF THE INVENTION

An object of the present invention is to provide a fully biodegradable multilayer mulch sufficiently resistant to biodegradation to last for an entire seasonal growth and, at the same time, sufficiently resistant and stiff to meet the requirements of modern mechanized agricultural production. The purpose of the invention is also to provide a mulch capable of being preprogrammed to have a biodegradation rate varying according to the type of soil, the type of climate and the type of culture wherefore it is intended to be used.

According to an aspect of the invention, the mulch comprises a sheet of a cellulosic material having an upper face and a lower face; and at least two different layers of biodegradable polymers coated onto at least one face of said sheet, one of these layers being a layer of polylactide. Preferably, an uppermost layer among these layers of polymers is a layer of polylactide. The mulch is capable of installation on the ground with a mechanical unrolling device, although it exhibits an increased tearing strength and an increased stiffness when compared to a mulch coated solely with a layer of polylactide.

According to another aspect of the invention, the biodegradability of the mulch is controlled by varying: a) the weight of the sheet; b) the thickness of the sheet; and/or c) the weight of the layers of biodegradable polymers coating the sheet. Preferably, the sheet of cellulosic material has a weight between about 40 to about 100 $g/m^2$, a thickness between 60 to 175 $\mu m$, and it is selected from the group consisting of virgin wood fibers, recycled wood fibers, cotton fibers and mixtures thereof.

Typically, the layers of polymers weigh from about 10 $g/m^2$ to about 50 $g/m^2$ and comprise from about 30 to about 70 w/w percent of polylactide. Preferably, polylactide is selected from the group consisting of D-polylactide, L-polylactide and mixtures thereof, and the biodegradable polymer(s) other than polylactide is selected from the group consisting of polycaprolactone, polyesters and mixtures thereof.

It is also an object of this invention to provide a method of preparing a biodegradable mulch comprising the steps of: providing a sheet of a cellulosic material having an upper face and a lower face; and depositing on at least one face of the sheet by a co-extrusion process at least two different layers of biodegradable polymers, wherein one of these layers is a layer of polylactide. Using such method, it is possible to deposit simultaneously the layers onto the sheet and also coat simultaneously two different cellulose sheets and thereby produce sandwich-like structure mulches.

It is still an object of this invention to provide a method of improving agricultural production comprising the steps of:

providing a biodegradable mulch comprising a sheet of a cellulosic material having at least one face coated with two different layers of biodegradable polymers, wherein one of said at least two different layers is a layer of polylactide; and placing the mulch on the ground to provide a growth zone for plants.

Preferably, an uppermost layer among the layers is a layer of polylactide and the mulch is provided in the form of a roll and it is placed on the ground with a mechanical unrolling device. Typically, the mulch is deposited on the ground such that its layer(s) of polylactide is in contact with the soil but it can also be deposited on the ground such that the layer(s) of polylactide faces air. This method has the advantages of providing a growth zone free of weeds and also buffer soil temperature during day and night.

An advantage of the present invention is that the mulch exhibits an increased tearing strength and an increased rigidity when compared to a mulch coated solely with a layer of polylactide. The use of multiple layers of polymers also provide a better coating and accordingly, resistance to biodegradability.

Other objects and advantages of the present invention will be apparent upon reading the following non-restrictive description of several preferred embodiments, made with reference to the accompanying drawings.

Similar references are used in different figures to denote similar components.

DESCRIPTION OF SEVERAL PREFERRED EMBODIMENTS OF THE INVENTION

Figure 1:
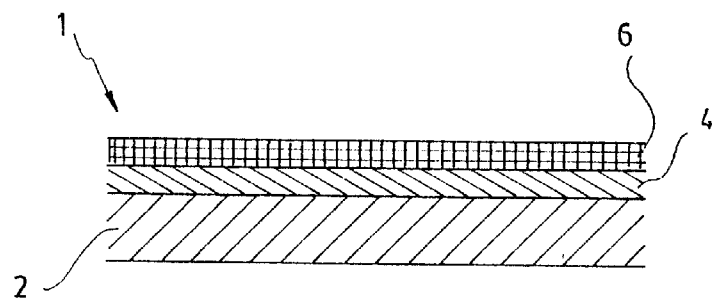
FIGS. 1, 2, 3 and 4 are side cross-section views of various embodiments of a multilayer mulch according to the present invention.
Figure 2:
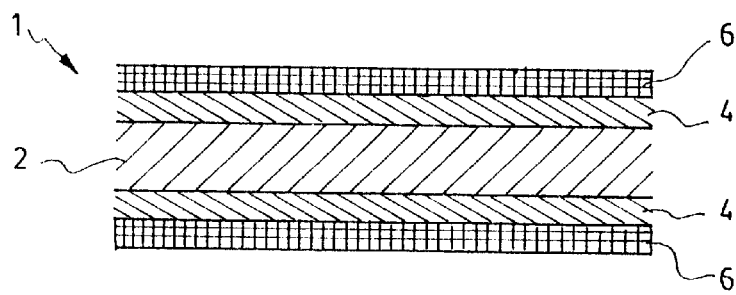

As show in FIG. 1, the biodegradable mulch 1 of the present invention comprises a sheet of a cellulosic material 2 having at least one face coated with at least two different layers 4,6 of biodegradable polymers. As show in FIG. 2, the sheet 2 of cellulose can have an upper face and a lower face both coated with at least two different layers 4,6 of biodegradable polymers. One of these layers 4,6, preferably the uppermost layer 6, is a layer of polylactide (PLA).

Although not shown, the mulch may comprise three layers of polymers or more on a single face. Although not shown either, the mulch may also comprise a two layers or more of biodegradable polymers on one face, and a single layer of biodegradable polymers, preferably PLA, on the other face.

Figure 3:
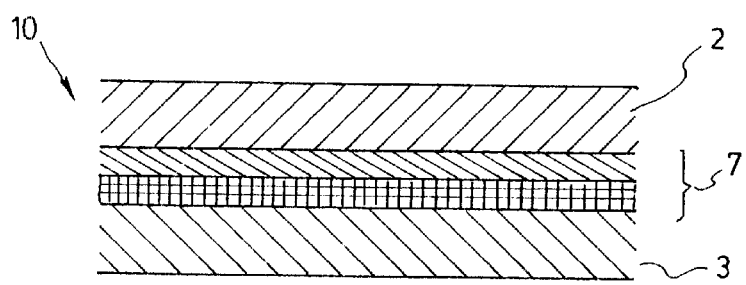
Figure 4:
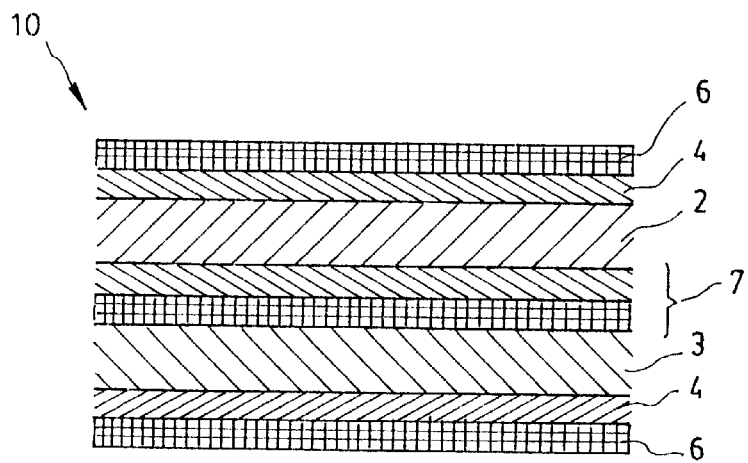

FIGS. 3 and 4 show two other embodiments of the invention, wherein the mulch further comprises an additional sheet 3 of a cellulosic material, and forms a sandwich-like structure 10. As shown in FIGS. 3 and 4, the additional sheet 3 has an inside face bounded to at least one of the inside layers 7 of biodegradable polymers.

The multilayer mulch of the invention can be produced by using a hot extrusion process, preferably a co-extrusion process. As it is well known in the art, extrusion coating is a process in which an extruder forces a melted material such as thermoplastics through a horizontal-slot die onto a moving web of substrate material. The melted material forms a continuous film and by controlling the application rate, one can control the thickness of the film deposited on the web. The melted stream can be extruded in one or several layers simultaneously, and the layers can be used as a coating or as an adhesive to sandwich two webs together. Various colors and additives can also be added. According to the method of the invention, the biodegradable polymers are brought to a liquid state and the layers are deposited (one at a time or simultaneously) on the sheet. The layer(s) are left to solidify to adhere to the sheet and to constitute the mulch therewith. The procedure can be repeated for multiple coating and/or for coating both faces of the sheet. It is also possible to produce a sandwich-like structure by depositing the liquid biodegradable polymers simultaneously between two sheets of cellulosic material.

The cellulosic material of the sheet is preferably selected from the group consisting of virgin wood fibers, recycled wood fibers, cotton fibers and mixtures thereof. The virgin wood fibers are not limited by the type of wood species and they can be produced by conventional pulping processes used in the pulp and paper industry such as thermo-mechanical pulping (TMP) and chemical pulping. The sheet may comprise recycled wood fibers from the recycled and wasted products or from other cellulosic fibers source such as cotton in the form of fibers or dust. For agricultural uses, the sheet preferably has a weight between about 40 $g/m^2$ to about 100 $g/m^2$ and a thickness between 60 to 175 $\mu$m. For forestry uses, the sheet has a weight of at least about 400 $g/m^2$, preferably between about 400 $g/m^2$ to about 1000 $g/m^2$. The thickness of such sheet is preferably between 600 $\mu$m to 1600 $\mu$m.

Many products are claimed to be biodegradable but they are not since they produce non-biodegradable by-products and residues. For instance, polyethylene/starch mixtures result in small particles of non-biodegradable polyethylene following biodegradation, only the starch fraction being entirely biodegradable. According to the present invention, the suitable polymers are those which are fully biodegradable such that they do not leave nor produce any residues.

As mentioned previously, polylactide (polylactic acid or PLA) is one of the rare polymers which are considered to be truly biodegradable. Its degradation cycle is based on a process of hydrolysis of the polymer chain. It is decomposed into lactose, water and carbon dioxide. Polylactide is thus completely biocompatible, i.e. neither the polymer nor its degradation products, are damaging to the health of living organisms. Accordingly, the mulch of the present invention comprises a layer of polylactide coated onto the sheet of cellulose. Preferably, polylactide is selected from the group consisting of D-polylactide, L-polylactide and mixtures thereof. As it will be demonstrated by way of examples hereinafter, PLA permits to achieve a two-step biodegradation: 1) an hydrolysis step (30 to 40 days), then 2) a microorganism biodegradation. These properties explain why it is preferable that the uppermost layer of the mulch of the invention be a layer of polylactide.

Unexpectedly, the present inventors have found that it is possible to improve PLA coated mulches by applying to the sheet at least one further layer of another biodegradable polymer. Surprisingly, the tearing strength and the stiffness of the resulting multilayer mulch is greatly increased without any detrimental effect to the biodegradation properties, as it will be shown by way of examples hereinafter.

The use of multiple layers of polymers provides also a better coating. Indeed, the application of multiple layers of polymers reduces the amount of imperfections in the coating. Imperfections such as pin holes are a result of the hot-extrusion process and these are caused by humidity and vertically extending cellulosic fibers. Therefore, the use of multiple layers of polymers reduces the porosity of the mulch and increases its resistance to biodegradability accordingly.

As mentioned previously, the others suitable polymers are those which are fully biodegradable such that they do not leave nor produce any residues. The polymers known to have these properties are polycaprolactone, some acrylic copolymers, polyhydroxybutyrate (PHB), mixtures of polyhydroxybutyrate/polyhydroxyvalerate (PHB/PHV), starch base polymers, polyethylene oxide blends and some polyesters such as poly(tetramethylene adipate-co-terephthalate). More preferably, the biodegradable polymers other than PLA constituting the layer(s) are selected from polycaprolactone, poly(tetramethylene adipate-co-terephthalate) and mixtures thereof. A person skilled in the art will however understand that the present invention is not limited solely to these biodegradable polymers and that other fully biodegradable polymers could also be used. Preferably, the layers of polymers weigh from about 10 g/m² to about 50 g/m², and about 30 to about 70 percent of this weight is polylactide.

The mulch of the invention is therefore fully biodegradable. Furthermore, the biodegradability of the mulch can be preprogrammed according to the type of soil (organic, sandy minerals, high clay content, etc.), the climatological zones (equatorial, tropical, arid, Mediterranean, temperate, etc.), and the specific applications (agriculture, horticulture, forestry, etc.) it is intended to be used for. For instance, it will be known hereinafter by way of examples that the type of soil has a drastic effect on the mulch efficiency and behavior. Organic soils have a high water content with a high concentration of microorganisms, two conditions which highly stimulate biodegradation. High clay content mineral soils shrink and expand under climatic cycles. Sandy mineral soils are more stable under climatic cycles with less microorganism concentration than the organic soil, representing in slower biodegradation. To be effective, the mulch must stay in place at least sixty days, some cultures requiring a mulch for one hundred days.

According to the present invention, biodegradability of the mulch is preprogrammed and controlled by varying:

a) the weight of the sheet(s) of cellulosic material;

b) the thickness of the sheet(s); and/or c) the weight of the layers of biodegradable polymers coating the sheet(s).

For instance, the examples disclosed hereinafter show that, in North Florida, USA, a tropical climate with a sandy mineral soil, best results were obtained with a mulch comprising a sheet of paper having a weight of about 67 g/m², a thickness of about 108 $\mu$m, the sheet having one of its faces coated with a first layer of about 8 g/m² of poly (tetramethylene adipate-co-terephthalate) and an uppermost layer PLA of about 8 g/m². However, in mineral soil in Québec, Canada (a temperate climate), the same mulch was not as good and the best results were obtained with a mulch comprising a sheet of paper having a weight of about 67 g/m², a thickness of about 108 $\mu$m, the sheet having both of its faces coated with a first layer of about 12 g/m² of poly(tetramethylene adipate-co-terephthalate) and an uppermost layer PLA of about 10 g/m².

Controlled biodegradability is therefore an important property of the mulch of the invention since, if the biodegradation is too rapid, the mulch will tear at the interface air-soil and will not be efficient. The mulch must also be sufficiently resistant to prevent the growth of weeds which could grow through the mulch. To the opposite, if the biodegradation is too slow, the mulch will not biodegrade before the next crop season and it will be necessary to recover it. In an ideal situation, the mulch will be optimized to remain in place until it has been completely biodegraded and, at the end of the season, no particular disposition will be required. Biodegradation should have converted the cellulosic material and the polymer layers of the mulch in a brittle structure that will offer no resistance to the mechanical working of the soil. A simple harrowing will be sufficient to incorporate the mulch into the soil. Moreover, the natural fertilizing properties of cellulose (deriving from the sheet), lactose (deriving from PLA) and other compounds (deriving from the other layer(s) of polymer), will enrich the soil.

It is also preferable that the mulch of the invention be not too glossy. Indeed, an advantage of the mulch is that it provides an excellent thermal insulation to young seeds by preserving humidity of the ground during the night. To achieve this, during the day the mulch must absorb energy from the sun and transfer it to the ground. A highly glossy mulch would reflect most sunrays to the plant and therefore no energy will be transferred to the ground. It is therefore possible to add a coloring agent to color the sheet of cellulose and/or the layers of polymers as desired: white, black or any other color to increase/limit sunrays transmission to the plants or the ground in order to optimize the yields of the plants. Preferably, carbon black is used since an amount of 0.5 to 5% added to the coating increases light absorption greatly and reduces opacity by more than 90%. However, any other organic or inorganic colors can be used at a level varying from 0–10% w/w percent of polymers.

The mulch of the invention may further comprise biological additives. For instance, it may comprise aluminum dust to promote the capability of repelling aphids. It may also comprise fertilizers for promoting the growth of plants, such as fertilizers having a nitrogen-phosphorus-potassium ratio selected from the group consisting of 10-6-0, 0-20-0, 0-0-22 and mixtures thereof.

The mulch of the invention thereby meets the requirements of modern agricultural production. Indeed, it has a sufficient useful life to last during an entire seasonal growth. It has also the required tearing strength to resist to mechanized installation but, at the same time it is not too stiff in order to be rolled and applied to the ground using a mechanical unrolling device. Indeed, the improved tearing strength and stiffness of the mulch according to the invention permits to reduce the time of application of the mulch to the ground, since it is possible to increase the speed of the unrolling device and thereby increase field productivity.

Although the main anticipated use of the multilayer mulch of the invention is for the agriculture industry, the person skilled in the art will understand that the invention is capable of many modifications and that it can be used in many other culture related industries such as forestry and horticulture. For instance, as it will be demonstrated by way of examples hereinafter, a mulch with a PLA layer weight of 50 g/m² is very stiff and remains non biodegradable for more than 119 days. Accordingly, such a mulch could be useful in the forestry or horticulture science. Preferably, layers of about 25 to about 75 g/m² of polymers (including from about 15 to about 60 g/m² of PLA) would be coated on a cellulosic layer of at least 400 g/m². More preferably, the multilayer coated sheet would be laminated to a second coated cellulosic layer as shown in FIGS. 3 and 4. Once again, the sheet and layers weight would be adjusted to program a biodegradation rate and physical properties judged important for a desired specific use. The final product could be cut into square or circular shapes with a central hole and a slit in order to facilitate installation of the mulch around a plant stem or a tree.

EXAMPLES

The following examples are illustrative of the wide range of applicability of the present invention and are not intended to limit its scope. Modifications and variations can be made therein without departing from the spirit and scope of the invention. Although any methods and materials similar or equivalent to those described herein can be used in the practice for testing of the present invention, the preferred methods and materials are described.

Example 1

Biodegration Experiments a) Mulch Preparation

As shown in Table 1, different agricultural mulches were designed and prepared as follows: a kraft paper of 60 g/m² was coated on a single or on both of its faces with a first layer of poly(tetramethylene adipate-co-terephthalate). (EASTAR®, Eastman Chemical, Kingsport, Tenn.) and a second uppermost layer of polylactic acid (Heplon™ from Chronopol, Denver, Colo.) using a standard commercial co-extrusion process. In one case, a layer of polylactic acid was laminated between two sheets of cellulose to form a sandwich-like structure (ST). The amount of the uppermost polylactic acid layer was adjusted to different levels from 10 g/m² to 50 g/m² whereas the amount of the first layer was adjusted and maintained at 50% w/w of the PLA layer without exceeding 20 g/m².

The processing speed of the extruder was adjusted to 300 feet/min with a screw speed of 30 RPM. The temperatures used were: 150° C. in the feed zone; 180° C. in the transition zone, 190° C. in the metering zone; 195° C. in the die zone.

TABLE 1

| | Variable amount of polylactide (g/m²) coated onto the sheet | | |
|---|---|---|---|
| | 1st face | 2nd face | ST |
| Mulch #1 | 8 | 15 | — |
| Mulch #2 | 15 | 0 | — |
| Mulch #3 | 15 | 15 | — |
| Mulch #4 | 25 | 25 | — |
| Mulch #5 | 50 | 50 | — |
| Mulch #6 | — | — | 15 | b) Field Testing

Using a standard mulch machine, 100 meter by 75 cm wide mulches were installed into different agricultural soils, in different countries and under different climatic conditions. Ten centimeters long mulches edges were both buried and covered by the soil. The biodegradation rate was evaluated by rating the quality of the buried edges. The quality of the coating which was facing the sun was also evaluated. These ratings are shown in Table 2.

TABLE 2

| Rating | Coating | Buried Edges |
|---|---|---|
| 1 | complete integrity | complete integrity |
| 2 | Cracks | soft but still attached to the paper |
| 3 | separated from the paper at 25–50% | initial stages of separation |
| 4 | separated from the paper at 50–75% | not more than 50% |
| 5 | almost completely gone | more than 75% degraded |
| — | completely gone | 100% degraded |

Biodegradation rating were evaluated at regular intervals and control of weeds was also measured as indicated hereinafter.

c) Results

The following tables resume the results obtained.

Series 1: Sandy Mineral Soil in North Florida, USA (Tropical Climate)

TABLE 3

| | Buried edges rating vs. Number of days | | | | | | |
|---|---|---|---|---|---|---|---|
| Mulch # | 14 | 21 | 28 | 42 | 56 | 96 | 119 |
| 1 | 1 | 1 | 1 | 2 | 2 | 3 | 4 |
| 2a* | 1 | 1 | 2 | 3 | 4 | 5 | — |
| 2b* | 1 | 1 | 1 | 2 | 3 | 4 | 4 |
| 3 | 1 | 1 | 1 | 1 | 2 | 2 | 3 |
| 4 | 1 | 1 | 1 | 1 | 1 | 2 | 2 |
| 5 | 1 | 1 | 1 | 1 | 1 | 1 | 1 |
| 6 | 1 | 1 | 1 | 2 | 3 | 4 | 5 |
| Paper only | 4 | 5 | — | — | — | — | — |

*The polymer coated face of the sheet was facing the sun (2a) or the soil (2b).

TABLE 4

| | Coating rating vs. Number of days | | | | | | |
|---|---|---|---|---|---|---|---|
| Mulch # | 14 | 21 | 28 | 42 | 56 | 96 | 119 |
| 1 | 1 | 1 | 1 | 1 | 2 | 2 | 3 |
| 2a | 1 | 1 | 1 | 2 | 2 | 3 | 3 |
| 2b | N/A | N/A | N/A | N/A | N/A | N/A | N/A |
| 3 | 1 | 1 | 1 | 2 | 2 | 2 | 3 |
| 4 | 1 | 1 | 1 | 1 | 1 | 2 | 2 |
| 5 | 1 | 1 | 1 | 1 | 1 | 1 | 1 |
| 6 | N/A | N/A | N/A | N/A | N/A | N/A | N/A |
| Paper only | N/A | N/A | N/A | N/A | N/A | N/A | N/A |

Series 2: Organic Soil in Québec, Canada (Temperate Climate)

TABLE 5

| | Buried edges rating vs. Number of days | | | | | | |
|---|---|---|---|---|---|---|---|
| Mulch # | 14 | 21 | 28 | 42 | 56 | 96 | 119 |
| 1 | 1 | 1 | 2 | 2 | 3 | 5 | — |
| 2a* | 1 | 2 | 3 | 4 | 5 | — | — |
| 2b* | 1 | 1 | 2 | 2 | 3 | 4 | 5 |
| 3 | 1 | 1 | 1 | 2 | 2 | 3 | 4 |
| 4 | 1 | 1 | 1 | 1 | 2 | 2 | 3 |
| 5 | 1 | 1 | 1 | 1 | 1 | 1 | 1 |
| 6 | 1 | 1 | 1 | 2 | 3 | 4 | 5 |

*The polymer coated face of the sheet was facing the sun (2a) or the soil (2b).

TABLE 6

| | Coating rating vs. Number of days | | | | | | |
|---|---|---|---|---|---|---|---|
| Mulch # | 14 | 21 | 28 | 42 | 56 | 96 | 119 |
| 1 | 1 | 1 | 1 | 1 | 2 | 2 | 3 |
| 2a | 1 | 1 | 1 | 2 | 2 | 3 | 4 |
| 2b | N/A | N/A | N/A | N/A | N/A | N/A | N/A |
| 3 | 1 | 1 | 1 | 2 | 2 | 2 | 3 |
| 4 | 1 | 1 | 1 | 1 | 1 | 2 | 2 |
| 5 | 1 | 1 | 1 | 1 | 1 | 1 | 1 |
| 6 | N/A | N/A | N/A | N/A | N/A | N/A | N/A |

Series 3: Mineral Soil (High Clay Content) in Québec, Canada (Temperate Climate)

TABLE 7

| | Buried edges rating vs. Number of days | | | | | | |
|---|---|---|---|---|---|---|---|
| Mulch # | 14 | 21 | 28 | 42 | 56 | 96 | 119 |
| 1 | 1 | 1 | 2 | 3 | 4 | 5 | — |
| 2a* | 1 | 2 | 3 | 4 | 5 | — | — |
| 3 | 1 | 1 | 2 | 3 | 3 | 4 | 5 |
| 4 | 1 | 1 | 1 | 1 | 2 | 2 | 3 |
| 5 | 1 | 1 | 1 | 1 | 1 | 1 | 1 |
| 6 | 1 | 2 | 3 | 5 | — | — | — |

*The polymer layers were facing the sun (2a)

TABLE 8

| | Coating rating vs. number of days | | | | | | |
|---|---|---|---|---|---|---|---|
| Mulch # | 14 | 21 | 28 | 42 | 56 | 96 | 119 |
| 1 | 1 | 2 | 3 | 3 | 4 | 5 | — |
| 2a | 2 | 3 | 3 | 4 | 5 | — | — |
| 3 | 1 | 1 | 2 | 2 | 3 | 3 | 4 |
| 4 | 1 | 2 | 2 | 3 | 3 | 4 | 4 |
| 5 | 1 | 1 | 1 | 1 | 1 | 2 | 2 |
| 6 | N/A | N/A | N/A | N/A | N/A | N/A | N/A | d) General Observations
 i. Paper mulch durability varied according to the type of soil and the mulch design.
 ii. The biodegradation rates observed varied from less than 14 days (uncoated sheet) to more than 119 days (50 g/m² PLA both sides coated sheet).
 iii. The PLA coat weight has a drastic effect on the biodegradation rate of the paper mulch. It is therefore possible to program the mulch durability.
 iv. As expected, the type of soil had little effect on the coating biodegradation except for high clay content mineral soils. In that specific case, the shrinkage and expansion of the bed due to climatic cycles fracture the PLA layer. The paper layer sticks to the high clay bed surface which, under shrinkage and expansion of the mulch-bed interface, fractures the PLA coating. When at least one PLA layer is in direct contact with the high clay content bed surface, the adherence of the paper mulch to the bed surface is reduced with less coating cracks and a higher durability in both buried edges and surface coating. Durability of the ST mulch (#6) is low when used in high clay content mineral soil. Therefore, mulch design is very important to reach required durability.
 v. No weed grows under all paper mulches while they remain intact. This is specially true when at least one coating layer was colored or modified by additives (data not shown).
 vi. Without any fumigation, the coated mulch controlled the nudge sedge as compared to polyethylene plastic mulch where the nudge sedge develops, perforates and tears the mulch (data not shown).
 vii. At a PLA weight higher than 50 g/m², the paper mulch durability remains non biodegradable and must be recovered before the next crop season. Furthermore, with such a coat weight, the mulch is too stiff and not enough malleable to be installed by standard mulch machines.
 viii. With a coating of 25 g/m² of PLA on both sides, the mulch remains in a condition that permits to use it for a second crop season.

Example 2

Weed Control

Because of the relative inefficacy of the available herbicides, weed control in lettuce is done manually or mechanically, which constitutes a major inconvenience. For this type of culture, the mulch of the invention could be an alternate method. Therefore, the effect of various coated paper mulches on yield of lettuce and weed control in an organic soil was evaluated.

a) Field Testing

Ithaca lettuce, a heat-sensitive crop, was transplanted into raised beds covered with 2 different types of mulches. The multilayer biodegradable mulch according to the invention consisted of a cellulosic sheet of different density (0.60 g/cc and 0.75 g/cc) coated on both sides with a first layer of 8 g/m² of poly(tetramethylene adipate-co-terephthalate) and a second uppermost layer of 10 g/m² of PLA. The mulches were applied with a Kennco™ uni-combo mechanical mulch application machine. The efficiency of these two mulches was measured and compared with hand-weeded ground areas and non-weeded ground areas.

A Campbell Scientific CR-10™ station was also installed to collect data on the temperature at 10 cm under the mulches using a cooper-constant thermocouple. The moisture content under the mulch was also measured with a water content reflectometer (Campbell Scientific). The data were collected on a continuous basis every fifteen minutes.

b) Results
 i. No monocot weeds were found under the mulches of the invention and dicot weeds were completely controlled after 14 days for 0.60 g/cc cellulosic layer and only after seven days for the 0.75 g/cc cellulosic layer. The denser the cellulosic layer is, the better the weed control, due to a higher opacity of the mulch. The weeds under the multilayer coated mulches did not develop beyond the cotyledon or two true leaves stage, nor did they compete with the crop plants. Addition of color into the biodegradable polymer layer reduced the opacity of the paper mulch and increased the weed control to almost 100%.
 ii. The multilayer coated mulches increased the soil temperature during the coldest period of the growing season and reduced the soil temperature during the warmest period of the growing season. Accordingly, the multilayer coated mulches had a buffering effect on the temperature variations, since it reduced the temperature differences between the day and the night. Higher density of cellulosic sheets had a better buffering effect.
 iii. A higher machine speed was observed when placing the multilayer coated mulches on the ground when compared to standard plastic films. The low stiffness and rigidity of the plastic mulch caused the plastic mulch to block into the unwinding system. The high stiff multilayer mulch resulted in a much faster application.
 iv. More plants in the weeded and non-weeded controls die compared with the plants grown on mulches, which indicates that the biodegradable mulches of the invention increase yield crop.
 v. Lettuce grown on the mulches of the invention produced plants with heavier biomass and larger head compared with the weeded and the non-weeded controls.
 vi. After the crop season, all the multilayer mulches were plowed and all mulches were completely biodegraded within less than a month.

Example 3

Physical Properties

The physical properties of various mulches were also studied. Three different mulches were prepared:
i) a paper sheet (64 g/m$^2$) coated with a unique layer of PLA (14 g/m$^2$) using a single extrusion process;
ii) a paper sheet (64 g/m$^2$) coated with two different layers using a co-extrusion process: 8 g/m$^2$ polycaprolactone and 8 g/m$^2$ D-PLA (1/1 ratio);
iii) a paper sheet (64 g/m$^2$) coated with two different layers using a co-extrusion process: 28 g/m$^2$ polyester and 28 g/m$^2$ D-PLA (1/1 ratio).

Unexpectedly, it was found that the multilayer co-extruded mulches had highly improved physical properties when compared to an uncoated paper sheet or a paper sheet coated with PLA only. Results are summarized in Table 9.

TABLE 9

|  | Paper sheet | Single layer PLA | Multilayer Polycaprolactone/ PLA | Multilayer Polyester/PLA |
|---|---|---|---|---|
| Total mulch weight (g/m$^2$) | 64 | 78 | 80 | 120 |
| Total thickness ($\mu$m) | 108 | 119 | 120 | 143 |
| Bursting strength (kPa) | 250 | 280 | 270 | 354 |
| Ring crush (lb · f) | 11.1 | 19.9 | 12.1 | 16.3 |
| Cross Direction (CD) tearing strength (mN) | 706 | 793 | 1205 | 1652 |
| Machine Direction (MD) tearing strength (mN) | 582 | 622 | 821 | 895 |
| Stiffness (g · f) | 2.0 | 2.5 | 3.2 | 4.7 |

As shown, the tearing strength of the multilayer polycaprolactone/PLA mulch was greatly improved when compared to the single layer PLA mulch, although both mulches had the same total weight. Indeed, the CD and MD tearing strength were increased respectively by 52% and 32%. The stiffness was also increased by 28%. Similarly, although coating the sheet with layers of polyester/PLA increased the total weigh of the mulch by only 54% when compared to the single layer PLA mulch, the multilayer coating increased the CD and MD tearing strength by 110% and 44% respectively, and the stiffness by 88%. It is thus clear that mulches coated with layers of two different polymers had their physical properties improved, particularly the CD tearing strength and the stiffness. These results are surprising and are also very significant, since the above biodegradability tests have shown that biodegradation mostly occur at the soil-air interface and that under these conditions, the CD tearing strength is critical for an extended durability of the mulch. Stiffness is also very important to control nudge sedge.

While several embodiments of the invention have been described, it will be understood that the present invention is capable of further modifications, and this application is intended to cover any variations, uses, or adaptations of the invention following, in general, the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A mulch with a preprogrammed biodegradability comprising:
   a sheet of a cellulosic material having an upper face and a lower face; and
   at least two different layers of biodegradable polymers coated onto at least one face of said sheet;
   wherein one of said at least two different layers is a layer of polylactide.

2. The mulch of claim 1, wherein an uppermost layer among said layers of polymers is a layer of polylactide.

3. The mulch of claim 2, wherein the layer of polylactide and the other(s) of said at least two layers are deposited simultaneously onto said sheet using a co-extrusion process.

4. The mulch of claim 2, wherein said different layers of polymers comprise from about 30 to about 70 w/w percent of polylactide.

5. The mulch of claim 2, wherein said mulch exhibits an increased tearing strength and an increased stiffness when compared to a mulch coated solely with a layer of polylactide.

6. The mulch of claim 2, wherein said mulch is capable of installation on the ground with a mechanical unrolling device.

7. The mulch of claim 2, wherein said mulch does not exhibit a high gloss.

8. The mulch of claim 2, wherein said mulch preprogrammed biodegradability is controlled by varying:
   a) the weight of said sheet;
   b) the thickness of said sheet; and/or
   c) the weight of the layers of biodegradable polymers coating said sheet.

9. The mulch of claim 8, wherein said biodegradability is preprogrammed according to the type of soil and the climatological zone wherefore said mulch is intended to be used.

10. The mulch of claim 8, wherein said mulch is preprogrammed for an agricultural use and wherein the sheet has a weight between about 40 to about 100 g/m$^2$, a thickness between 60 to 175 $\mu$m and the layers of polymers weigh from about 10 g/m$^2$ to about 50 g/m$^2$.

11. The mulch of claim 8, wherein said mulch is preprogrammed for a forestry use and wherein the sheet has a weight between about 600 to about 1000 g/m$^2$ and a thickness between 600 to 1600 $\mu$m and the layers of polymers weigh from about 25 g/m$^2$ to about 75 g/m$^2$.

12. The mulch of claim 2, wherein polylactide is selected from the group consisting of D-polylactide, L-polylactide and mixtures thereof.

13. The mulch of claim 2, wherein the biodegradable polymer(s) other than polylactide is(are) selected from the group consisting of polycaprolactone, poly(tetramethylene adipate-co-terephthalate) and mixtures thereof.

14. The mulch of claim 13, wherein the polyester is poly(tetramethylene adipate-co-terephthalate).

15. The mulch of claim 2, wherein the cellulosic material is selected from the group consisting of virgin wood fibers, recycled wood fibers, cotton fibers and mixtures thereof.

16. The mulch of claim 2, wherein the upper face and the lower face of said sheet are both coated with at least two different layers of biodegradable polymers.

17. The mulch of claim 1, further comprising an additional sheet of a cellulosic material having an inside face bounded to at least one of said layers, the mulch thereby forming a sandwich-like structure.

18. An agricultural mulch with a preprogrammed biodegradability comprising:

a sheet of a cellulosic material selected from the group consisting of virgin wood fibers, recycled wood fibers, cotton fibers, and mixtures thereof, the sheet having a weight between about 40 to about 100 g/m² and a thickness between 60 to 175 µm; and at least two different layers of biodegradable polymers coated onto at least one face of said sheet and weighing from about 10 g/m² to about 50 g/m², an uppermost layer among said at least two different layers being a layer of polylactide constituting about 30 to about 70 w/w percent of said layers weight, the other layer(s) being selected from the group consisting of polycaprolactone, poly(tetramethylene adipate-co-terephthalate and mixtures thereof.

19. A method of preparing a biodegradable mulch which comprises:

providing a sheet of a cellulosic material having an upper face and a lower face; and depositing on at least one face of said sheet by a co-extrusion process at least two different layers of biodegradable polymers, wherein one of said at least two different layers is a layer of polylactide.

20. The method of claim 19, wherein an uppermost layer among said at least two layers is a layer of polylactide.

21. The method of claim 20, wherein said different layers of biodegradable polymers weigh from about 10 g/m² to about 50 g/m² and comprise from about 30 to about 70 w/w percent of polylactide.

22. A method of improving agricultural production comprising:

providing a biodegradable mulch comprising a sheet of a cellulosic material having at least one face coated with two different layers of biodegradable polymers, wherein one of said at least two different layers is a layer of polylactide; and placing said mulch on the ground to provide a growth zone for plants.

23. The method of claim 22, wherein an uppermost layer among said at least two layers is a layer of polylactide.

24. The method of claim 23, wherein said mulch is deposited on the ground such that said layer of polylactide is in contact with the soil.

25. The method of claim 23, wherein said mulch is deposited on the ground such that said layer of polylactide faces air.

26. The method of claim 22, wherein said mulch is provided in the form of a roll and wherein the mulch is placed on the ground with a mechanical unrolling device.

27. The method of claim 22, wherein said growth zone is thereby free of weeds and has thereby a buffered soil temperature.

* * * * *